Aug. 11, 1942.    A. J. GRANBERG    2,292,631
FLUID METER
Filed Sept. 3, 1940    3 Sheets-Sheet 1
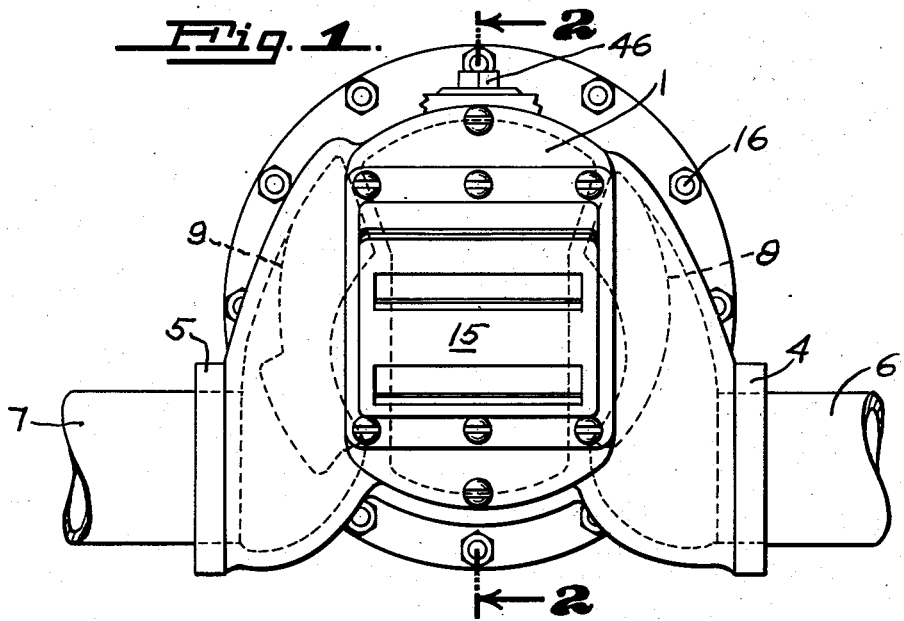
Fig. 1.
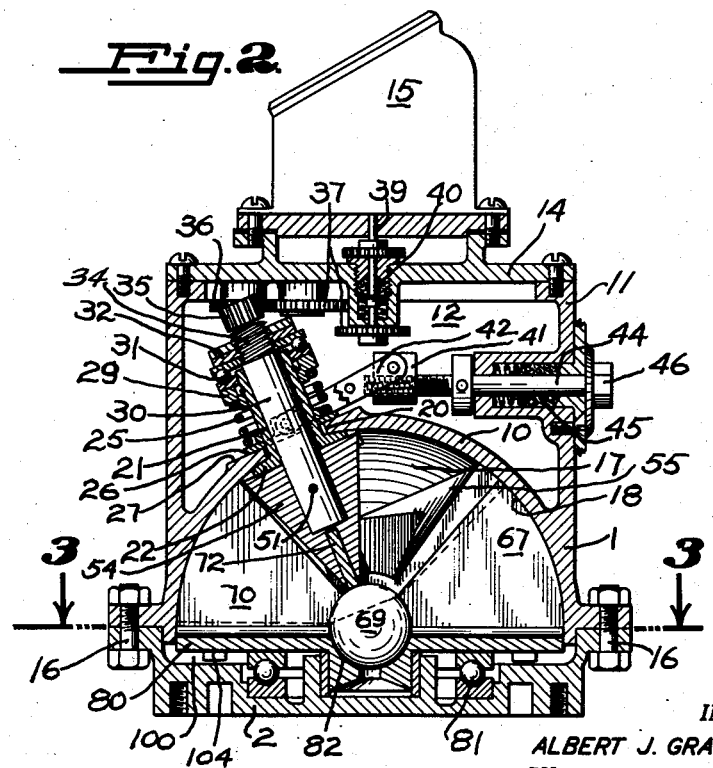
Fig. 2.
INVENTOR,
ALBERT J. GRANBERG.
BY
ATTORNEYS.

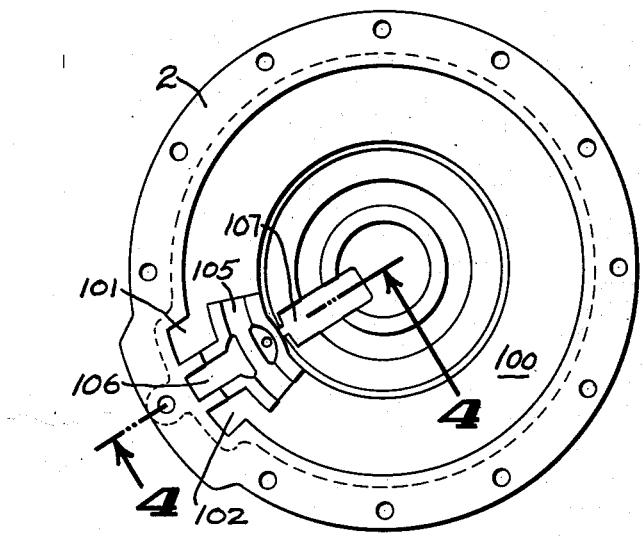
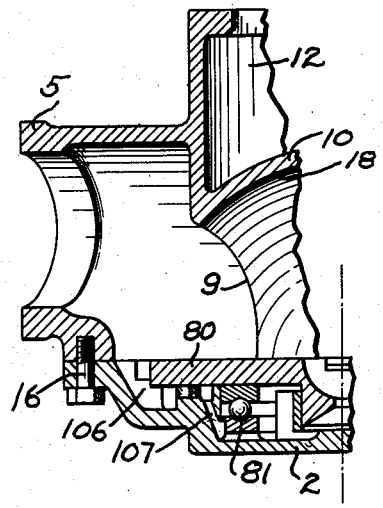
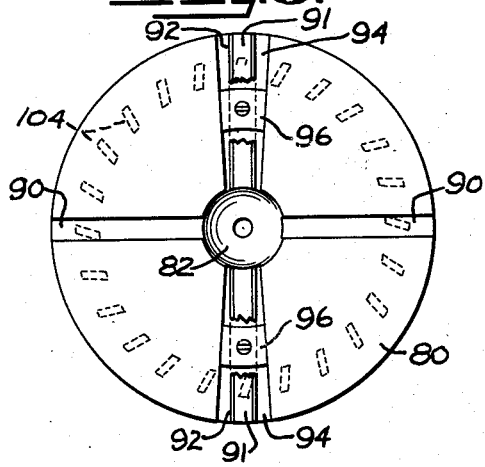
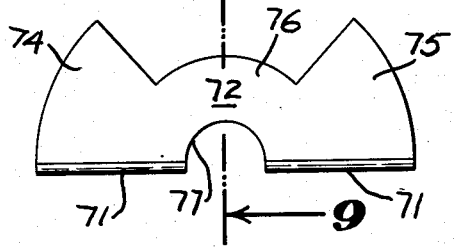
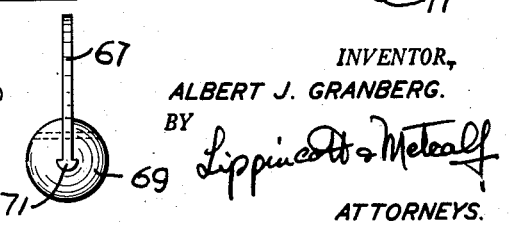
INVENTOR,
ALBERT J. GRANBERG.
BY Lippincott & Metcalf
ATTORNEYS.

Aug. 11, 1942.  A. J. GRANBERG  2,292,631
FLUID METER
Filed Sept. 3, 1940  3 Sheets-Sheet 3

INVENTOR.
ALBERT J. GRANBERG.
BY
Lippincott & Metcalf
ATTORNEYS.

Patented Aug. 11, 1942

2,292,631

UNITED STATES PATENT OFFICE 2,292,631

FLUID METER

Albert J. Granberg, Emeryville, Calif., assignor to Granberg Equipment Inc., Emeryville, Calif., a corporation of California Application September 3, 1940, Serial No. 355,157

7 Claims. (Cl. 73—253)

My invention relates to fluid meters and more particularly to a meter that is exceptionally accurate at all rotational speeds.

Among the objects of my invention are:

To provide an accurate fluid meter; to provide a fluid meter requiring a relatively small amount of power to operate; to provide a fluid meter that is accurate under different rates of liquid flow; to provide a fluid meter that can be easily adjusted as to output; to provide a relatively light weight and simple fluid meter; to provide a fluid meter having a self-cleaning structure; to provide a fluid meter having relatively few parts and relatively low frictional losses.

Other objects of my invention will be apparent or will be specifically pointed out in the description forming a part of this specification, but I do not limit myself to the embodiment of the invention herein described, as various forms may be adopted within the scope of the claims.

In the drawings,

Fig. 1 is a top plan view of the casing of one preferred form of my invention.

Fig. 2 is a sectional view taken as indicated by the line 2—2 in Fig. 1.

Fig. 3 is an interior view taken in elevation as indicated by the line 3—3 of Fig. 2.

Fig. 4 is a partial sectional view taken as indicated by the line 4—4 in Fig. 3.

Fig. 5 is a view in elevation of the rotating base plate of the device shown in Figs. 1 and 2.

Fig. 6 is a side view of one vane.

Fig. 7 is an end view of the vane shown in Fig. 6.

Fig. 8 is a side view of another vane.

Fig. 9 is a sectional view of the vane shown in Fig. 8 taken as indicated by the line 9—9 in Fig. 8.

Figure 10:
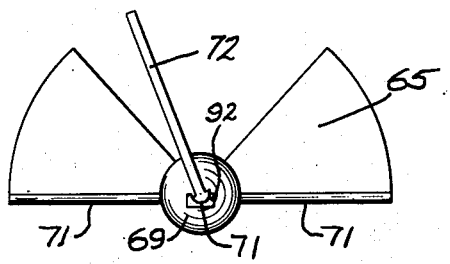
Fig. 10 is a view in elevation showing the blades in interlocked position.

My invention may be more clearly understood by direct reference to the drawings.

Beginning with Figs. 1 and 2, an exterior casing is provided comprising a top 1 and a base 2. The top 1 is provided with an inlet 4 and an outlet 5 to which inlet and outlet pipes 6 and 7 may be respectively attached. Inlet 4 and outlet 5 open into inlet and outlet ports 8 and 9 respectively, on opposite sides of a hemispherical wall 10. Top 1 is also provided with upright walls 11 enclosing a gear chamber 12 above wall 10, this gear chamber being closed by a top cap 14 carrying a recording mechanism 15 of any convenient type. The base 2 is attached to top 1 by bolts 16 so that a hemispherical meter chamber 17 is formed, having the inner spherical surface 18 thereof machine finished. At one side of the vertical axis of the meter chamber 17, is a shaft bearing aperture 20 cut through wall 10, in which is mounted a shaft bearing 21, having an inner shoulder 22 bearing against the machined surface 18 of the meter chamber 17. Shoulder 22 is held against the spherical chamber surface 18 by a compression spring 25, bearing at one end against a washer 26 which in turn bears against flat surface 27 machined on the outside of the wall 10. The other end of the spring 25 bears against a ring 29 locked to shaft bearing 21. Thus, at all times spring 25 forces shoulder 22 against the inner surface 18 of meter chamber 17.

Mounted in shaft bearing 21 is a rotor shaft 30 extending into meter chamber 17 at one end, and beyond ring 29 at the other end. Shaft 30 is journaled on ball bearing 31 held in place against rotor shaft 30 by lock washers 32 screwed on end threads 34. The shaft terminates within gear chamber 12 as a spur gear 35 meshing angularly with companion gear 36, which in turn through gear train 37 actuates the recording device 15 through recording shaft 39 extending through top plate 14 in a packed bearing 40. Thus, any rotation of shaft 30 will be transmitted to the recording mechanism 15. Bearing 21 is smaller than aperture 20 so that shoulder 22 can move circumferentially within chamber 17. This movement is under control of a yoke 42 attached to washer 26, yoke 42 being moved by nut 41 threaded on shaft 44. Shaft 44 passes through side walls 11 through packed bearing 45, to terminate in an adjustment nut 46 on the other side of the casing 1. Thus the angular position of shaft 30 may be adjusted within the limits of the size of aperture 20.

Figure 15:
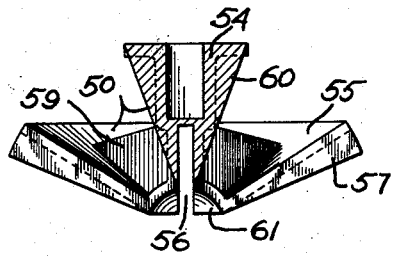
Fig. 15 is a sectional view of the vane cage taken as indicated by the line 15—15 in Fig. 14.
Figure 13:
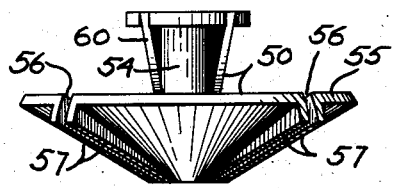
Fig. 13 is a side view in elevation of the vane cage.
Figure 14:
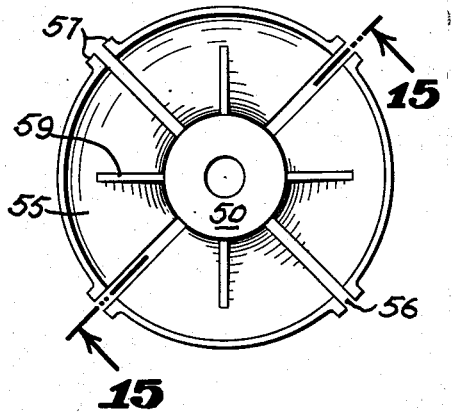
Fig. 14 is a top view of the vane cage.
Figure 12:
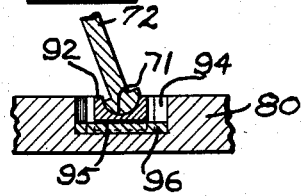
Fig. 12 is a partial sectional view of the base plate and a vane taken as indicated by the line 12—12 in Fig. 11.

Inside meter chamber 17 a vane cage 50 is attached to shaft 30 by means of pin 51 entering vane cage stem 54, as shown in Fig. 2, the vane cage alone being shown in Figs. 13, 14 and 15. Stem 54 is centrally attached to a coned flange 55, this cone flange having four radial slots 56 therein with 90° spacing, the slot edges 57 preferably being extended downwardly to provide vane bearings. In order to strengthen the structure, reinforcing ribs 59 are provided between stem 54 and flange 55, and upright reinforcing ribs 60 are provided on stem 54 opposite slots 56 to form lands for the vanes. The apex of the cone flange 55 is formed with a hemispherical recess 61 to receive the vane structure which will next be described.

Figure 11:
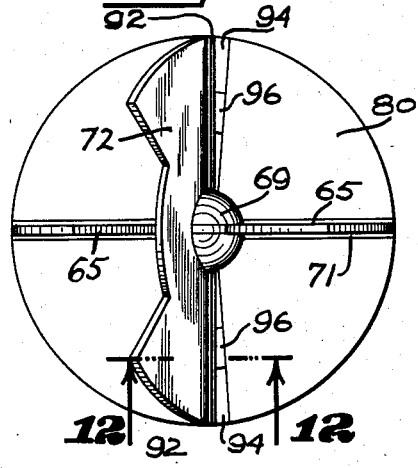
Fig. 11 is a top view in elevation showing the vanes only in position on the base plate.

Two vanes are provided, fitting in vane cage 50. These vanes are slightly different in general structure as shown in Figs. 6 to 12 inclusive. One is a ball vane 65 formed from opposed roughly triangular and coplanar vane leaves 66 and 67, the apex of the leaves entering spherical ball 69 and the bases 70 of the leaves, having spherical surface edges fitting machined surface 18. The lower edges of leaves 66 and 67 are coextensive on either side of the ball 69 and are formed with hemispherical bearing surfaces 71. Cooperating vane 72 is provided with opposed coplanar leaves 74 and 75 connected by a bridge 76, the latter having a hemispherical central cut 77 fitting over ball 69 as shown in Figs. 10 and 11 when the two vanes are assembled. The lower surface of both leaves 74 and 75 are also provided with coextensive hemispherical lower edges 71.

When the vanes are placed in the vane cage 50 they will be at right angles to each other, and their lower edges are held in a common plane by the engagement of hemispherical lower edges 71 with a rotating base plate 80 as shown in Figs. 2 and 11, this base plate being mounted on ball bearing 81 attached to base 2 of the case. Rotating base plate 80 has a central recess 82 therein for receiving half of ball 69 with the center of this ball lying in the axis of shaft 30 and also registering with the center of the top surface of plate 80. Vanes 65 and 72 while held at right angles to each other with respect to the vane cage 50, will have their symmetrical axes, as indicated by line 82 in Fig. 6 and by line 9—9 in Fig. 8, at constantly changing angles to each other as cage 50 is rotated. The vanes during rotation always have a portion of the leaves in slots 56, and their maximum penetration of the cage brings the leaves up to lands 60.

In order that base plate 80 may be rotated with the vanes, and in order that the four meter chambers as formed by the base plate, the four vanes leaves and the conical flange 55, may be sealed from each other, the lower hemispherical edges 71 of the leaves are mounted in slots 90 and 91 forming a part of base plate 80. Slots 90 are machined directly in the top face of base plate 80 and fits hemispherical edges 71 on either one of the vanes. Slots 91 however, are machined in separate radial inserts 92, these inserts being placed in fan-shaped depressions 94 on opposite sides of the ball recess 82. Inserts 91 and 92 are provided with lower surface slots 95, fitting lugs 96 affixed to plate 80 in depressions 94 so that both inserts 92 may move circularly in the plane of base plate 80 while engaging edges 71 of the vane. The reason for this circular movement will be apparent upon later description of operation of the device.

Before passing to the operation of the device however, the self-cleaning structure of the meter should be described. No attempt is made to seal the edge of plate 80 fluid tight to the casing, so that fluid in the various chambers of the meter during operation thereof may reach cavity 100 beneath base plate 80 in which ball bearing 81 is positioned. In a freely revolving meter of this type leakage between inlet and outlet around the edge of plate 80 is negligible due to the relatively low pressure existing between inlet and outlet. A small amount of leakage is beneficial as the meter chamber will thus be scavenged of heavier liquids entering the meter. I have provided means, operating in this cavity, to scavenge liquid therein into the output of the device, as it is to this point that liquids heavier than the liquid being metered are liable to accumulate. For example, when the meter is used to measure gasoline flow, water and dirt will seek the lower portion of the meter and if allowed to accumulate will tend to destroy the efficiency and accuracy of the meter. Consequently, adjacent the sides of outlet port 9 of the meter I cut in casing base 2, inlet passages 101 and 102 entering space 100, and then provide on the bottom of base plate 80 angularly disposed downwardly extending centrifugal vanes 104. As the meter rotates these vanes pass through slot 105 in base 2 and force liquid from cavity 100 outwardly through base outlet 106, thus continually changing the liquid in cavity 100. In addition, I provide a channel 107 opening into slot 105 to scavenge liquid from in and around ball bearing 81 as shown in Figs. 3 and 4.

In operation, liquid is passed through the assembled meter with a pressure differential between inlet 6 and outlet 7. The angle of shaft 30 is such that the liquid enters as the compartments between the vane leaves are enlarging, and as the cage and the vanes rotate these chambers pass through their maximum size and become smaller due to the conical shape and position of the vane cage 50. The conical flange 55 on one side of the meter is at its maximum distance from base plate 80, and on the other side of the meter the conical flange is positioned parallel to and close to base plate 80. During this rotation the position symmetrical axes of the vanes will change. For example, the only time that the symmetrical axes or the plane of either of the vanes will be vertical, is when the vane is in a position exactly at right angles to the direction of the flow through the meter. At that time the axis of symmetry of the other vane is coextensive with the axis of shaft 30. Thus the vanes while at right angles to each other in two planes are continually changing their relationship to each other insofar as their own symmetrical axes are concerned.

The bottom edges of the vanes are always in sealing relationship with disc 80, due to the fact that hemispherical edges 71 of at least one vane, are mounted in slot 90. Thus as this vane rotates, disc 80 is rotated. The other vane is not in driving contact with disc 80 but rests in slots 91 on radial inserts 92, these inserts being free to move circumferentially on disc 80. Only one of the vanes can be journaled directly on plate 80 because of the angular positioning of plate 80 with respect to shaft 30. Inasmuch as the angle of the axis of symmetry of each blade changes within the angle between that of the vertical axis of the chamber 17 and that of the axis of shaft 30, the contact angles of the two vanes on plate 80 will be right angles only four times during one revolution of the meter, i. e., only when the axis of symmetry of one vane is vertical and coinciding with the axis of the meter chamber 17. Inasmuch as there are two vanes, the symmetrical axis of each vane becomes vertical twice per revolution. At all other times during the cycle of revolution of the meter, the vanes vary in their angular contact with plate 80. Consequently, in order to prevent binding of the vanes on plate 80, one of the vanes is mounted on sliding inserts 92, so that the sliding inserts may follow the vane edges and take the proper angular position on plate 80.

Thus a rocking bearing is provided for both vanes, one of which bears on the plate 80 itself, and the other bears on a sliding insert, which in turn is slidably mounted on plate 80 to have circumferential travel thereon. The seal between the chambers is therefore constantly maintained and no binding occurs. The device is very free running, due to the fact that plate 80 is mounted on ball bearings 81 and shaft 30 is also mounted on ball bearing 31. The internal rotating parts of the meter are machined to clear by a small amount the machined surface 18 as for example, by .001 inch, and inasmuch as plain bearing 20 is only a positioning bearing the frictional losses of the device are extremely small.

The adjustment of the device is a simple operation. Nut 46 is rotated, causing yoke 42 to change the angle of shaft 30. Changing the angle of shaft 30 toward the vertical increases the size of the smallest vane chamber, and decreases the size of the largest vane chamber. When shaft 30 is moved away from the vertical axis of the device, the smallest chamber becomes smaller and the largest chamber becomes larger. Thus by positioning the shaft midway between the maximum and minimum angles, accurate adjustment is provided, whereby the volume of liquid passed through the device per revolution can be changed.

It will be noticed that I have used an angular gear relationship between gears 35 and 36. This angular relationship is such that the angle of shaft 30 can be changed within the limits desired without causing binding of these gears and without changing the operation of the gear train.

While I have described my invention as embodied in the form of a fluid meter it is to be understood that such a structure is reversible and that by driving shaft 30 the device will operate as a pump. The term meter as used herein therefore is merely descriptive of one use of the structure as set forth in the drawings, specification and claims of this application.

I claim:

1. A rotary liquid flow device comprising a casing having a spherically segmental inner chamber, a rotatable shaft angularly projecting into said chamber, a coaxial coned flange on said shaft, a rotatable disc positioned with a planar surface thereof parallel to one radius of said coned flange, the center of said planar surface lying in the axis of said coned flange, a pair of vanes extending into slots in said flange, one of said vanes directly engaging said disc, and movable radial vane inserts in said disc engaged by the other of said vanes and movable over a surface of said disc in contact therewith in a plane parallel to the top surface thereof, and a closure for said casing on the other side of said disc, said disc being journaled thereon.

2. A rotary liquid flow device comprising a casing having a spherically segmental inner chamber, a rotatable shaft angularly projecting into said chamber, a coaxial coned flange on said shaft, a rotatable disc positioned with a planar surface thereof parallel to one radius of said coned flange, the center of said planar surface lying in the axis of said coned flange, a pair of vanes extending into slots in said flange, one of said vanes directly engaging said disc, and movable radial vane inserts in said disc engaged by the other of said vanes and movable over a surface of said disc in contact therewith in a plane parallel to the top surface thereof, a closure for said casing on the other side of said disc, said disc being journaled thereon, and means for limiting the movement of said inserts to circular paths.

3. Apparatus in accordance with claim 1 wherein means are provided to change the angularity of said shaft with respect to said disc.

4. Apparatus in accordance with claim 1 wherein recording means are geared to said shaft.

5. Apparatus in accordance with claim 1 wherein a space is provided between said disc and said closure, together with means rotating with said disc to circulate and discharge fluid reaching said space.

6. Apparatus in accordance with claim 1 wherein inlet and outlet ports are formed in said casing and connected to opposite compartments formed by said vanes, flange and disc and wherein a space is provided between said disc and said closure, said space being connected to the outlet of said device, and means mounted on said disc and operating in said space to return liquid in said space to said outlet.

7. Apparatus in accordance with claim 1 wherein inlet and outlet ports are formed in said casing and connected to opposite compartments formed by said vanes, flange and disc and wherein a space is provided between said disc and said closure, said space being connected to the outlet of said device, and non-radial fins projecting downwardly into said space from said disc and directed to move liquid entering said space into said outlet.

ALBERT J. GRANBERG.